Jan. 17, 1967  W. N. WILCOX  3,298,392
PRESSURE REGULATOR
Filed June 1, 1964
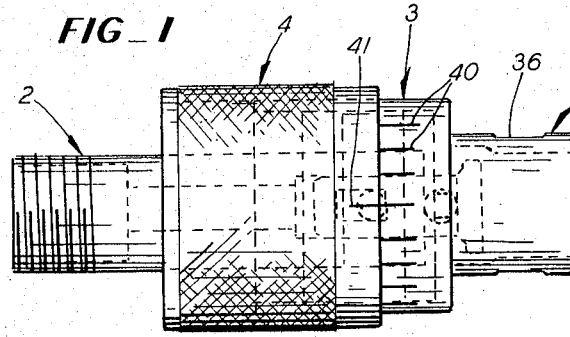
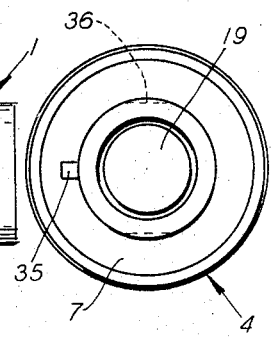
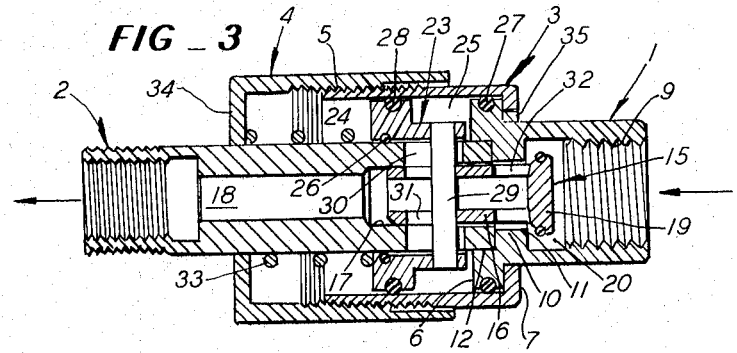
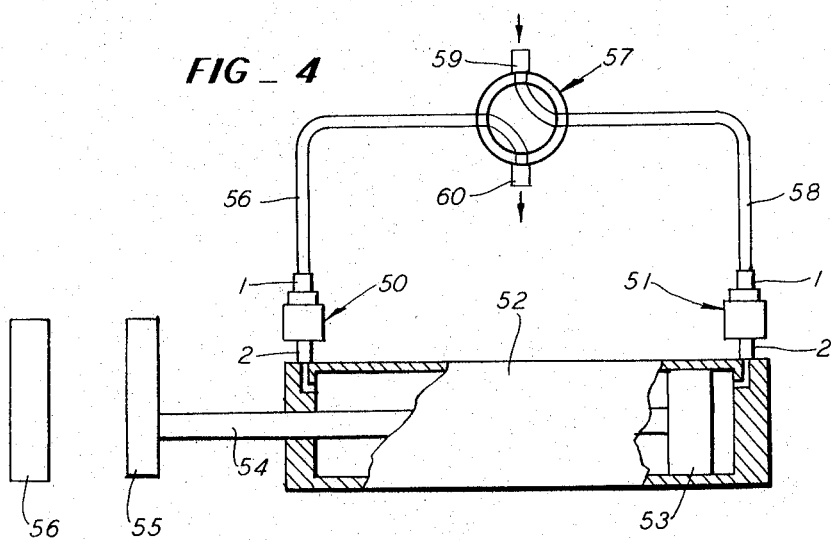
INVENTOR.
WARREN N. WILCOX
BY
*Boyken, Mohler & Foster*
ATTORNEYS United States Patent Office 3,298,392
Patented Jan. 17, 1967

3,298,392
PRESSURE REGULATOR
Warren N. Wilcox, 16736 Foothill Blvd.,
San Leandro, Calif. 94578
Filed June 1, 1964, Ser. No. 371,558
2 Claims. (Cl. 137—505.25)

This invention relates to pressure regulators of the type used to reduce line pressure to substantially constant outlet pressure, and has for one of its objects a simple, economically made, reliable pressure regulator that is adapted to be quickly positioned at any point in a pressure line, or directly to a tool that is adapted to be actuated by the reduced pressure and which pressure regulator is constructed to be substantially instantly adjusted to change the regulated outlet pressure.

Another object of the invention is the provision of a pressure regulator or pressure reducer that is formed with a straight central bore through which the gas is adapted to pass from the high pressure inlet at one end to the lower pressure outlet at the other end, and all the basic elements of the regulator are concentric with said bore, thereby eliminating all projections that normally project laterally relative to the bore and some of which include a manually manipulatable screw that extends perpendicular to the axis of the inlet and outlet.

Another object of the invention is the provision of a pressure regulator in which a free reverse flow of air through the regulator is permitted when the line pressure is discontinued and the pressure line is open from the regulator to the atmosphere, whereby the pressure regulator may function to exhaust air upon a reversal of air flow therethrough.

A still further object of the invention is the provision of a pair of pressure regulators in combination with a work transmitting, air actuated, reciprocable piston that is adapted to be moved in one direction under a predetermined working pressure regulated by one pressure regulator to do work and to be returned or moved in the opposite direction under a much lower pressure regulated by the other pressure regulator, and in which the exhaust air from the cylinder on an exhaust stroke passes freely through one of the regulators. The same source of air at the same pressure is connected with both regulators.

Other objects and advantages will appear in the description and claims.

In the drawings, FIG. 1 is a side elevational view of the pressure regulator, certain internal structure being indicated in broken lines.

FIG. 2 is an end view of the regulator of FIG. 1 as seen from the right hand end of the latter.

FIG. 3 is a vertical sectional view taken along lines 3—3 of FIG. 1.

FIG. 4 is a semidiagrammatic view of a pair of the pressure regulators of FIG. 1 in combination with a cylinder having an air actuated reciprocable piston therein that is to do work.

Referring to FIGS. 1–3 the pressure regulator comprises an open-ended air inlet cylinder 1 and an open-ended outlet cylinder 2 coaxial therewith, which cylinders are held together with a pair of outer cylinders 3, 4 that are coaxial with each other and with the cylinders 1, 2, the cylinder 4 being the outermost of all the cylinders 1–4 and telescopically extending over the cylinder 3, with which it is in threaded engagement at 5.

Cylinder 1 projects axially outwardly of cylinder 3 and 1 is formed at its inner end, within cylinder 3, with a radially outwardly projecting annular flange 6 while the cylinder 3 is formed with a radially inwardly extending flange 7 that is adapted to lap and to abut the outer axially facing surface of flange 6, when cylinders 1, 3 are in assembled relation.

Cylinder 1 is interiorily formed with threads 9 at the outer end of its bore for threadedly engaging any suitable main air pressure line or conduit.

The bore of cylinder 1 is restricted at a point within said cylinder that spaced from the inner end of thread 9 by a radially inwardly projecting annular wall 10 that is formed with an annular seat 11 on the radially inner edge of said wall that is nearest to the internally threaded end of the cylinder 1. The end of cylinder 1 within outer cylinders 3, 4 and opposite to threads 9 is counterbored at 12 to receive the inner end of cylinder 2 in a press fit so that said cylinders 1, 2 may be considered as being a single cylinder.

The bores of cylinder 2 and the wall 10 may be nearly the same, but that of wall 10 may be slightly larger, as seen in FIG. 2.

A tubular poppet valve, generally designated 15, is formed with a hollow stem 16 that is reciprocable within and coaxial with the inner and slightly enlarged end portion 17 of the central bore or passageway 18 of outlet cylinder 2. A circular, solid head 19 of the poppet valve is rigid on the end of stem 16 and is coaxial with and spaced within the portion 20 of the bore of the inlet cylinder 1, which portion is between wall 10 and the threads 9.

An annular sleeve or collar 23 is around the inner end of the outlet cylinder 2 adjacent to the flange 6 and this sleeve is formed with a radially outwardly projecting annular flange 24 on its end that is remote from flange 6, whereby an annular expandable chamber 25 will be formed between flanges 6 and 24 and around the portion of the sleeve 23 that projects toward flange 6.

An O-ring 26 forms an air tight seal between sleeve 23 and the outer surface of the outlet cylinder 2. One O-ring 27 forms an air tight seal between flange 6 and the inner cylindrical surface of cylinder 3, while a second O-ring 28 forms an air tight seal between the flange 24 and the inner surface of cylinder 3. The word "O-ring" is intended to cover any suitable seal, and is not necessarily used in a restrictive sense, although in the present construction the employment of O-rings is preferable.

The reduced diameter portion of sleeve 23 that extends from flange 24 to flange 6 is formed with diametrically opposed openings in which the ends of a pin 29 are releasably held. The inner end portion of the outlet cylinder 2 and the hollow stem 16 of the poppet valve 15 are respectively formed with openings 30, 31 through which pin 29 extends, and these openings are preferably oblong in shape, and extend longitudinally of the outlet cylinder and stem 16 so as to permit free movement of the pin and sleeve 23 longitudinally of the outlet cylinder 2 from end to end of said openings, and to also permit free longitudinal movement of the poppet valve 15 relative to pin 29. Also said openings provide for passage of air from the bore of stem 16 to the space between O-ring 26 and sleeve 23 and past the inner end of sleeve 23 that is adjacent to flange 6 into the expandable chamber 25.

The portion of the stem 16 adjoining head 19 of the poppet valve 15 is also formed with diametrically opposite openings 32.

A helical spring 33 is around and coxial with the outlet cylinder 2, and reacts between the sleeve 23 and a radially inwardly extending flange 34 formed on the outermost cylinder 4.

It should also be noted that a lug 35 projecting radially outwardly of the inlet cylinder 1 is adapted to fit within a complementarily formed recess in flange 7 when the latter is against said flange (FIG. 2) and the said inlet cylinder is formed on two of its oppositely outwardly facing surfaces with flat portions 36 (FIG. 1) for engagement with a wrench.

The outlet cylinder is formed with threads for connection with a work device to be supplied with air or with any suitable conduit through which the outlet air is to be conducted to a work device.

From the foregoing description it is seen that when the inlet cylinder is connected with a pressure line having gas under pressure and the outlet cylinder is closed, the pressure within the device is equalized. The poppet valve 15 will be held in open position by spring 33 so air or gas will freely pass the head 19 of the poppet valve and through openings 32 into the bore of the cylinder and out its open end into the outlet cylinder. Also, gas at the full pressure will pass through openings 30, 31 and past the sleeve 23 into the expansion chamber 25 that is between the flange 24 of sleeve 23 and the flange 6.

Assuming spring 33 is not under tension against sleeve 23 and the outlet is opened, the poppet valve 15 will immediately close. The degree of tension of spring 33 against sleeve 23 will determine the degree to which the poppet valve 15 will close, and consequently the outlet pressure. The outer cylinder 3 may have a row of graduation marks 40 inscribed on its outer surface along the free end edge of the outermost pressure adjusting cylinder 4, and the latter may be inscribed with a mark 41. Each mark 40, in turn, may be identified by a figure denoting a setting in pounds of air pressure per square inch of outlet air pressure of the mark 40 coinciding with mark 41. Obviously the cylinder 3 may carry the single mark and the row of graduations may be on cylinder 4.

Assuming the inlet pressure is 200 lbs. per square inch, and the spring 33 is set to a tension for delivering outlet air at 50 lbs. per square inch, the sleeve 23 will move the poppet valve toward the closed position, or to the left as seen in FIG. 3 to a point where the air is delivered from the outlet at 50 lbs. per square inch. Any increase or decrease in the pressure chamber 25 will be instantly inflected in movement of the sleeve 23 to vary the position of the poppet valve so as to maintain the outlet pressure substantially constant irrespective of any increase or decrease in the inlet pressure.

FIG. 4 is illustrative of an example in which a pair of pressure regulators, generally designated 50 and 51, are respectively positioned at opposite ends of a cylinder 52 with their outlets 2 communicating with the inside of the cylinder at opposite ends. Piston 53 is reciprocable within the cylinder, the piston rod 54 being slidable through the head of the cylinder adjacent to regulator 50, and the outer end of the rod 54 may carry jaw 55 of a vise that is movable toward and away from a fixed jaw 56.

The cylinder 1 of regulator 50 is connected with a conduit 56 leading to a four-way valve 57 while conduit 58 connects cylinder 1 of regulator 51 with valve 57. High pressure line 59 is connected with valve 57 as is an exhaust 60.

Assuming the high pressure line is at 200 lbs. p.s.i. and the pressure to be applied to the piston 53 for actuating the latter to move jaw 55 to work clamping relation is 50 lbs. p.s.i., the regulator 51 may be quickly set for this pressure. However, the jaw 55 may be returned to open position under a relatively small pressure of 10 lbs. p.s.i., or less, hence the regulator 50 is set for the low pressure required.

Valve 57 is indicated in a position in which air at the vise end of the cylinder is exhausting through the exhaust 60 while air at say 50 lbs. p.s.i. is admitted to the opposite end of the cylinder. The poppet valve within the regulator 50 will be in an open position such as indicated in FIG. 3 to freely pass the air in the vise end of cylinder 52 to the exhaust 60.

After the holding operation is completed by the vise, valve 57 is actuated to admit air into the vise end of the cylinder at say 10 lbs. p.s.i. and the air in the opposite end of the cylinder will freely pass out of exhaust 60.

By the foregoing arrangement, which is one of many arrangements involving a similar use of air, it is seen that a substantial saving is effected, since the vise may be used almost continuously throughout the day. Such an arrangement is not possible where air cannot freely pass through the regulator in a direction opposite to the one in which the high pressure air is admitted.

The fact that regulator is small and is substantially no more than a section of the air conduit leading to the appliance or machine to be actuated, enables the regulator to be directly connected to such appliance or machine, or closely adjacent thereto, so that the operator at the appliance or machine may instantly change the setting so as to regulate the outlet pressure without moving to some remote point at which the regulator is installed. There are no lateral projections on the regulator to unbalance it, or to catch on objects during movement of the device that is supplied with air from the regulator.

Furthermore the present regulator is adapted to be made on automatic screw machines and any replacement of seals or parts can be made quickly and with economy.

It is obvious that modifications can be made that come within the spirit of the invention and within the scope of the appended claims.

I claim:

1. A pressure regulator comprising:
  (a) an elongated central cylindrical member having a through central bore extending longitudinally thereof provided with an air inlet at one end for high presure air and an air outlet at the opposite end for low pressure air;
  (b) an outer wall having a cylindrical inner surface concentric with and spaced outwardly of said central member having opposite end portions in sealing engagement with the outer surface of said central member providing an annular air expansion chamber around and between said cylindrical inner member and said outer wall;
  (c) an annular member concentric with said inner cylindrical member disposed within said expansion chamber in slidable sealing engagement with the outer surface of said inner cylindrical member and with said inner surface of said outer wall for reciprocable movement relative to said inner member;
  (d) a port formed in said inner cylindrical member communicating between said through bore and said expansion chamber;
  (e) a poppet valve having a head at one end concentric with and spaced within said bore and a hollow stem coaxial with said head extending axially of the latter within said bore in a direction away from said air inlet, said head being spaced from said port in direction toward said air inlet;
  (f) a valve seat rigid with said inner cylindrical member disposed between said head and said port toward which said head is adapted to be moved under the influence of air from said inlet within said expansion chamber;
  (g) means connecting said annular member with said poppet valve for movement of said poppet valve away from said valve seat upon movement of said annular member in a direction toward said inlet; and
  (h) yieldable means reacting between said outer member and said annular member for yieldably urging said annular member generally toward said inlet and against the air pressure within said chamber under predetermined yieldable pressure for holding said poppet valve spaced from said seat a distance only sufficient to maintain a discharge of air at said outlet at a pressure that is substantially equal to the resistance of said yieldable means when said inlet is connected with a source of air under a pressure that is higher than the force exerted by said yieldable means in opposition to the pressure of air in said expansion chamber.

2. A pressure regulator comprising:
(a) an elongated cylindrical member having an open-ended through bore coaxial therewith providing an inlet for air at one end thereof and an outlet for air at the opposite end;
(b) a valve member spaced within said bore reciprocable axially of the latter and a valve seat between said member and said outlet toward and away from which said valve is adapted to move to effect a differential in the pressure of air within said bore at the inlet and outlet sides of said member;
(c) a housing spaced around and concentric with said cylindrical member in sealing relation with said cylindrical member at points spaced axially of the latter providing an expansion chamber around said cylindrical member between said points;
(d) an opening formed in said cylindrical member between said valve seat and said outlet communicating between said bore and said expansion chamber;
(e) valve actuating means reciprocable on said cylinder defining one end of said expansion chamber and actuatable for movement in one direction axially of said cylindrical member under the influence of the pressure of air admitted to said chamber through said opening;
(f) yieldable means connected with said valve actuating means yieldably resisting said movement of the latter in said one direction;
(g) connecting means connecting said valve member and said valve actuating means for holding said valve member in a position relative to said seat according to the pressure differential between said yieldable means and the air in said expansion chamber when said outlet is open and said inlet is connected with a source of air under pressure;
(h) said housing including means for varying the degree of tension of said yieldable means against said valve actuating means whereby the pressure differential between inlet air in said chamber and the force of said yieldable means may be varied to vary the pressure of air at said outlet relative to the pressure of air at said inlet when said outlet is open and said inlet is connected with a source of air under pressure;
(i) said valve member being free for a predetermined degree of movement relative to said connecting means in a direction away from said valve seat whereby said valve member is adapted to be moved away from said valve seat under the influence of the flow of air in said bore upon reversal of said flow for movement of said air from said outlet to said inlet.

References Cited by the Examiner

UNITED STATES PATENTS

| 672,787 | 4/1901 | Lewis | 137—505.25 |
| 3,038,493 | 6/1962 | Griffith | 137—505.25 |

FOREIGN PATENTS

| 1,216,484 | 11/1959 | France. |
| 949,004 | 2/1964 | Great Britain. |

ALAN COHAN, *Primary Examiner.*

HAROLD WEAKLEY, *Examiner.*